United States Patent
Zhu et al.

(10) Patent No.: US 10,713,491 B2
(45) Date of Patent: Jul. 14, 2020

(54) OBJECT DETECTION USING SPATIO-TEMPORAL FEATURE MAPS

(71) Applicant: Google LLC, Mountain View, CA (US)

(72) Inventors: Menglong Zhu, Playa Vista, CA (US); Mason Liu, Acton, MA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 16/047,362

(22) Filed: Jul. 27, 2018

(65) Prior Publication Data
US 2020/0034627 A1    Jan. 30, 2020

(51) Int. Cl.
*G06K 9/00* (2006.01)
*G06N 3/04* (2006.01)
*G06K 9/62* (2006.01)
*G06T 7/73* (2017.01)

(52) U.S. Cl.
CPC ....... *G06K 9/00718* (2013.01); *G06K 9/6232* (2013.01); *G06K 9/6262* (2013.01); *G06K 9/6277* (2013.01); *G06N 3/04* (2013.01); *G06N 3/0445* (2013.01); *G06N 3/0454* (2013.01); *G06T 7/74* (2017.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 10,445,881 B2* | 10/2019 | Spizhevoy | ............ | G06T 7/0002 |
| 2017/0076195 A1* | 3/2017 | Yang | ...................... | G06N 3/063 |
| 2017/0262705 A1* | 9/2017 | Li | ...................... | G06K 9/00718 |
| 2019/0034734 A1* | 1/2019 | Yen | ...................... | G06N 3/084 |
| 2019/0102908 A1* | 4/2019 | Yang | ................. | G06K 9/00335 |
| 2019/0130188 A1* | 5/2019 | Zhou | ...................... | G06T 7/248 |

OTHER PUBLICATIONS

Abadi et al. "Tensorflow: A system for large-scale machine learning," OSDI, Nov. 2, 2016, 21 pages.
Cho et al. "Learning phrase representations using rnn encoder-decoder for statistical machine translation," arXiv 1406.1078v3 Sep. 3, 2014, 15 pages.
Chollet. "Xception: Deep learning with depthwise separable convolutions," arXiv 1610.02357v3, Apr. 4, 2017, 8 pages.

(Continued)

*Primary Examiner* — Hadi Akhavannik
(74) *Attorney, Agent, or Firm* — Fish & Richardson P.C.

(57) ABSTRACT

Methods, systems, and apparatus, including computer programs encoded on a computer storage medium, for performing object detection. In one aspect, a method includes receiving multiple video frames. The video frames are sequentially processed using an object detection neural network to generate an object detection output for each video frame. The object detection neural network includes a convolutional neural network layer and a recurrent neural network layer. For each video frame after an initial video frame, processing the video frame using the object detection neural network includes generating a spatial feature map for the video frame using the convolutional neural network layer and generating a spatio-temporal feature map for the video frame using the recurrent neural network layer.

14 Claims, 4 Drawing Sheets

(56) References Cited

OTHER PUBLICATIONS

Dai et al. "R-fcn: Object detection via region-based fully convolutional networks," NIPS Dec. 2016, 9 pages.
Donahue et al. "Long-term recurrent convolutional networks for visual recognition and description," CVPR, Nov. 2015, 10 pages.
Feichtenhofer et al. "Detect to track and track to detect," ICCV, Oct. 2017, 9 pages.
Girshick. "Fast r-cnn," ICCV, Dec. 2015, 9 pages.
Girshick et al. "Rich feature hierarchies for accurate object detection and semantic segmentation," CVPR Jun. 2014, 8 pages.
Han et al. "Deep compression: Compressing deep neural network with pruning, trained quantization and Huffman coding," arXiv 1510.00149v5, Feb. 15, 2016, 14 pages.
Han et al. "Seq-NMS for video object detection," arXiv 1602.08465v3, Aug. 22, 2016, 9 pages.
He et al. "Spatial pyramid pooling in deep convolutional networks for visual recognition," ECCV Sep. 2014, 14 pages.
He et al. "Deep residual learning for image recognition," IEEE Conference on Computer Vision and Pattern Recognition, Jun. 2016, 9 pages.
He et al. "Identity mapping in deep residual networks," ICCV, Oct. 2016, 15 pages.
Hinton et al. "Distilling the knowledge in a neural network," arXiv 1503.02531, Mar. 9, 2015, 9 pages.
Hochreiter et al. "Long short-term memory," Neural computation, Nov. 1997, 32 pages.
Hong et al. "Pvanet: Lightweight deep neural networks for real-time object detection," arXiv 1611.08588, Dec. 9, 2016, 7 pages.
Howard et al. "Mobilenets: Efficient convolutional neural networks for mobile vision applications," arXiv 1704.04861, Apr. 17, 2017, 9 pages.
'github.com' [online] "Tensorflow models: Object_Detection," First Available on or before Jun. 15, 2017, [retrieved on Aug. 10, 2018] Retrieved from Internet: URL<https://github.com/tensorflow/models/tree/master/research/object_detection> 5 pages.
Iandola et al. "Squeezenet: Alexnet-level accuracy with 50x fewer parameters and 0.5md model size," arXiv 1602.07360v4, Nov. 4, 2016, 13 pages.
Jaderberg et al. "Speeding up convolutional neural networks with low rank expansions," arXiv 1405.3866, May 15, 2014, 12 pages.
Kang et al. "Noscope: Optimizing neural networks queries over video scale," arXiv 1703.02529v3 Aug. 8, 2017, 12 pages.
Kang et al. "T-cnn: Tubelets with convolutional neural networks for object detection from videos," arXiv 1604.02532v4, Aug. 3, 2017, 11 pages.
Kang et al. "Object detection from video tubelets with convolutional neural networks," CVPR Jun. 2016, 9 pages.

Krizhevsky et al. "Imagenet classification with deep convolutional neural networks," NIPS Dec. 2012, 9 pages.
Lebedev et al. "Speeding-up convolutional neural networks using fine-tuned cp-decomposition," arXiv 1412.6553,v3, Apr. 24, 2015, 11 pages.
Lin et al. "Focal loss for dense object detection," ICCV Oct. 2017, 9 pages.
Lipton et al. "A critical review of recurrent neural networks for sequence learning," arXiv 1506.00019,4 Oct. 17, 2015, 38 pages.
Liu et al. "Ssd: Single shot multibox detector," ECCV, Oct. 2016, 17 pages.
Ning et al. "Spatially supervised recurrent convolutional neural networs for visual object tracking," arXiv 1607.05781, Jul. 109, 2016, 10 pages.
Patraucean et al. "Spatio-temporal video autoencoder with differentiable memory," arXiv 1511.06309v5, Sep. 1, 2016, 13 pages.
Redmon et al. "You only look once: Unified, real-time object detection," CVPR Jun. 2016, 10 pages.
Ren et al. "Faster r-cnn: Towards real-time object detection with region proposal networks," NIPS, Dec. 2015, 9 pages.
Russakovsky et al. "Imagenet large scale visual recognition challenge," arXiv 1409.05753v3, Jan. 30, 2015, 43 pages.
Shi et al. "Convolutional lstm network: A machine learning approach for precipitation nowcasting," NIPS Dec. 2015, 9 pages.
Simonyan et al. "Very deep convolutional networks for large-scale image recognition," arXiv 1409.1556v6, Apr. 10, 2015, 14 pages.
Szegedy et al. "Going deeper with convolutions," IEEE Conference on Computer Vision and Patter Recognition, Jun. 2015, 9 pages.
Szegedy et al. "Intriguing properties of neural networks," arXiv 1312.6199v4, Feb. 19, 2014, 10 pages.
Tieleman et al. "Lecture 6.5-rmsprop: Divide the gradient by a running average of its recent magnitude," Coursera: Neural Networks for Machine Learning, 4(2), Oct. 2012, Video Lecture with transcript, [retrieved on Aug. 10, 2018] Retrieved from Internet: URL<https://www.coursera.org/lecture/neural-networks/rmsprop-divide-the-gradient-by-a-running-average-of-its-recent-magnitude-YQHki> 3 pages.
Wu et al. "Quantized convolutional neural networks fro mobile devices," CVPR, Jun. 2016, 9 pages.
Zhang et al. "Shufflenet: An extremely efficient convolutional neural network for mobile devices," arXiv 1707.01083v2 Dec. 7, 2017, 9 pages.
Zhou et al. "Incremental network quantization Towards lossless cnns with low precision weights," arXiv 1702.03044v2, Aug. 25, 2017, 14 pages.
Zhu et al. "Flow-guided feature aggregation for video object detection," ICCV, Mar. 2017, 10 pages.
Zhu et al. "Deep feature flow for video recognition," CVPR Jul. 2017, 10 pages.

* cited by examiner

OBJECT DETECTION USING SPATIO-TEMPORAL FEATURE MAPS

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that performs object detection in sequences of video frames.

According to a first aspect there is provided a method which includes receiving multiple video frames. The video frames are sequentially processed using an object detection neural network to generate an object detection output for each video frame. The object detection output for each video frame defines a predicted position and a predicted label of an object depicted in the video frame. The object detection neural network includes a convolutional neural network layer and a recurrent neural network layer. For each video frame after an initial video frame, processing the video frame using the object detection neural network includes deriving a convolutional layer input from the video frame. A spatial feature map is generated for the video frame by processing the convolutional layer input using the convolutional layer. A spatio-temporal feature map is generated for the video frame by processing (i) the spatial feature map for the video frame, and (ii) a spatio-temporal feature map generated by the recurrent neural network layer for a previous video frame, using the recurrent neural network layer. The output defining the predicted position and the predicted label of the object depicted in the video frame is generated using the spatio-temporal feature map.

In some implementations, the recurrent neural network layer is a long short-term memory layer.

In some implementations, using the recurrent neural network layer to process a recurrent layer input includes processing the recurrent layer input using a bottleneck gate including one or more convolutional neural network layers to generate a bottleneck representation. The bottleneck representation has a lower dimensionality than the recurrent layer input. An internal state of the recurrent neural network layer is updated using the bottleneck representation. The spatio-temporal feature map for the video frame is generated using the updated internal state of the recurrent neural network layer.

In some implementations, the output defining the predicted position and the predicted label of the object depicted in the video frame includes data defining a bounding box in the video frame and, for each of multiple object classes, a respective probability that the portion of the video frame inside the bounding box depicts an object of the object class.

In some implementations, the object detection neural network includes multiple convolutional neural network layers and recurrent neural network layers.

In some implementations, the object detection neural network is trained over multiple training iterations. The training includes a first number of training iterations, where the recurrent neural network layers are removed from the object detection neural network. The training includes a second number of training iterations, where the recurrent neural network layers are inserted into the object detection neural network.

In some implementations, deriving a convolutional layer input from the video frame includes processing the video frame using multiple convolutional layers, multiple recurrent neural network layers, or both.

According to a second aspect there is provided a method including processing multiple video frames using a video processing neural network. The video processing neural network includes a bottleneck recurrent neural network layer. For each video frame after an initial video frame, the processing includes deriving a feature map from a video frame. A recurrent layer input including (i) the feature map derived from the current video frame, and (ii) an output generated by a bottleneck recurrent layer for a previous video frame in the sequence that is previous to the current video frame, is processed using the bottleneck recurrent layer to generate a bottleneck recurrent layer output for the current video frame in the sequence. The recurrent layer input is processed using a bottleneck gate including one or more convolutional neural network layers to generate a bottleneck representation. The bottleneck representation has a lower dimensionality than the recurrent layer input. An internal state of the bottleneck recurrent layer is updated using the bottleneck representation. The bottleneck recurrent layer output for the current video frame is generated using the updated internal state of the recurrent layer. A video processing neural network output characterizing the video frame is generated using the bottleneck recurrent layer output.

In some implementations, deriving the feature map from the video frame includes processing the video frame using multiple convolutional neural network layers, multiple recurrent neural network layers, or both.

In some implementations, updating an internal state of the bottleneck recurrent layer using the bottleneck representation includes processing the bottleneck representation using a forget gate including one or more convolutional layers to generate a forget gate output. The internal state is element-wise multiplied by the forget gate output. The bottleneck representation is processed using an input gate including one or more convolutional layers to generate an input gate output. The bottleneck representation is processed using one or more convolutional neural network layers to generate a temporary update. An element-wise product of the input gate output and the temporary update is added to the internal state.

In some implementations, generating the bottleneck recurrent layer output for the current video frame using the updated internal state of the bottleneck recurrent layer includes processing the bottleneck representation using an output gate including one or more convolutional layers to generate an output gate output. The bottleneck recurrent layer output is determined to be an element-wise product of the output gate output and the updated internal state of the bottleneck recurrent layer.

In some implementations, the bottleneck gate includes one or more depth-wise separable convolutional layers.

In some implementations, the video processing neural network is an object detection neural network.

According to a third aspect there is provided a system including a memory storing instructions that are executable and one or more computers to execute the instructions to perform the operations of the previously described methods.

According to a fourth aspect there are provided one or more non-transitory computer storage media storing instructions that when executed by one or more computers cause the one or more computers to perform the operations of the previously described methods.

Particular embodiments of the subject matter described in this specification can be implemented so as to realize one or more of the following advantages.

The object detection neural network described in this specification includes a recurrent neural network layer. The recurrent neural network layer enables the object detection neural network to propagate information across time when processing sequences of video frames and thereby exploit various temporal cues to obtain more accurate and stable object detection outputs. The object detection neural network described in this specification may therefore outperform some conventional object detection neural networks which process each video frame independently of the others. Moreover, the object detection neural network described in this specification can propagate information generated at intermediate layers of the object detection neural network (i.e., frame-level information) over time. By propagating frame-level information over time, rather than only information generated at the output layer over the object detection neural network (i.e., detection-level information), the object detection neural network described in this specification can exploit the greater quantities of frame-level information to generate more accurate outputs. This is an improvement in the field of image processing.

The object detection neural network described in this specification can include bottleneck recurrent neural network layers. Bottleneck recurrent neural network layers may consume fewer computational resources (e.g., memory, computing power, and the like) than some conventional recurrent neural network layers. Therefore, the bottleneck recurrent neural network layers described in this specification can be deployed to resource-constrained environments (e.g., mobile devices) and in applications which require real-time processing speeds. Moreover, bottleneck recurrent neural network layers incur little (if any) reduction in prediction accuracy relative to some conventional recurrent neural network layers. This is also an improvement in the field of image processing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an object detection neural network that is configured to sequentially process a sequence of video frames to determine the positions and labels of the objects depicted in the video frames. The object detection neural network includes one or more recurrent neural network layers that propagate frame-level information across time and thereby exploit various temporal cues to obtain more accurate and stable object detection outputs. The recurrent neural network layers can be efficiently implemented as bottleneck recurrent neural network layers which can enable the object detection neural network to process videos in real-time and to be deployed to resource-constrained environments (e.g., mobile devices).

As will be described in more detail below, a recurrent neural network layer can generate a layer output by processing: (i) a current layer input, and (ii) an output previously generated by the recurrent neural network layer, using multiple "gates" (e.g., an input gate, a forget gate, and an output gate). Each gate may itself be implemented as a sequence of one or more neural network layers (e.g., convolutional layers). A bottleneck recurrent neural network layer generally includes a "bottleneck" gate, which is configured to project the data processed by the bottleneck recurrent neural network layer to a lower dimensionality representation (i.e., a "bottleneck representation").

These features and other features are described in more detail below.

Figure 1:
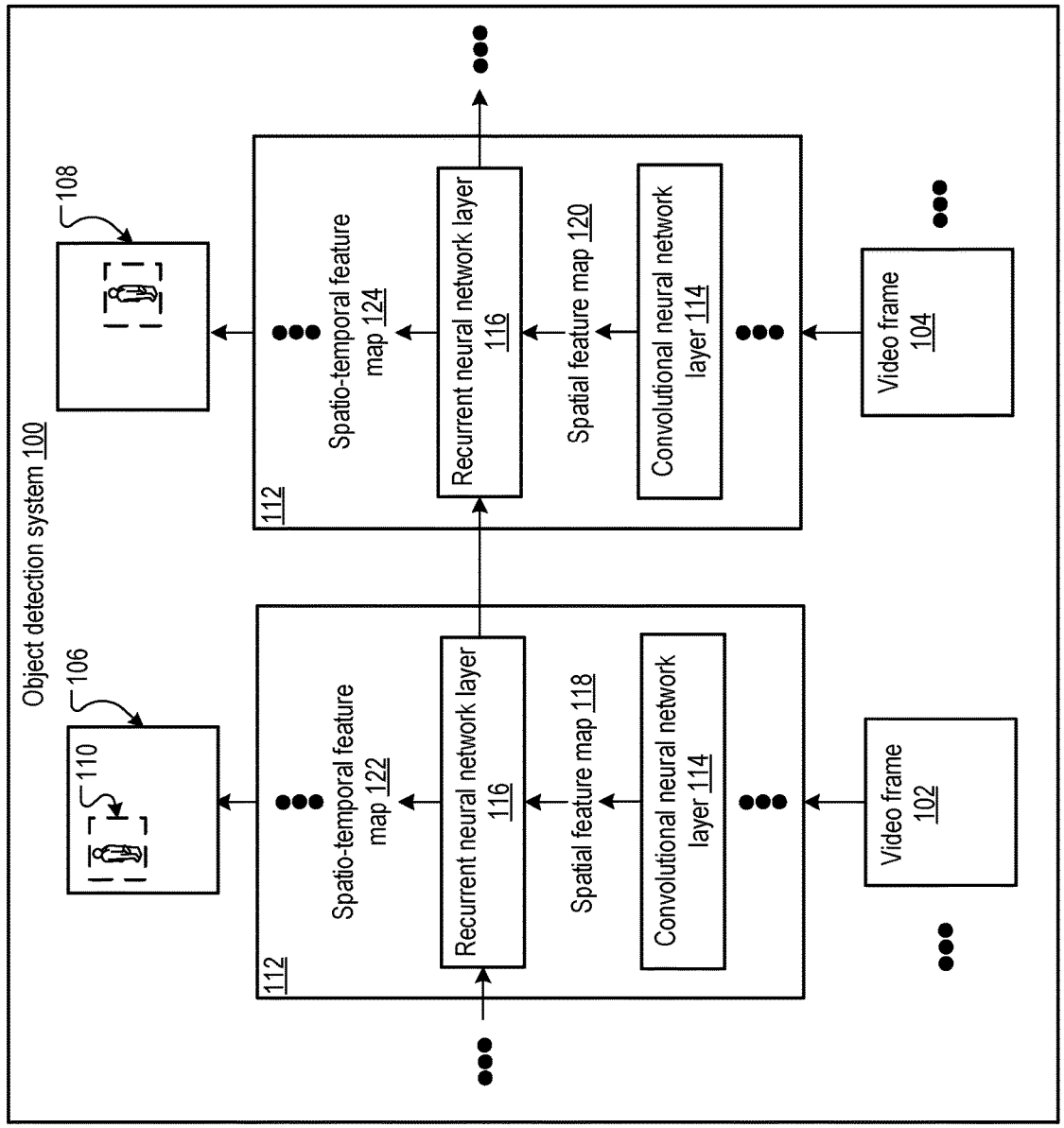
FIG. 1 is a block diagram of an example object detection system.

FIG. 1 shows an example object detection system 100. The object detection system 100 is an example of a system implemented as computer programs on one or more computers in one or more locations in which the systems, components, and techniques described below are implemented.

The object detection system 100 is configured to sequentially process a sequence of video frames (e.g., including the video frames 102 and 104) to generate an object detection output (e.g., including the object detection outputs 106 and 108) for each of the video frames. The object detection output generated by the system 100 for a video frame defines a position and a label for each of one or more objects depicted in the video frame. For example, the object detection output generated by the system 100 for a video frame may include data defining multiple bounding boxes in the video frame which delineate the positions of respective objects depicted in the video frame. For each bounding box, the object detection output may include respective probabilities that the portion of the video frame inside the bounding box depicts an object of each of multiple possible object classes. The possible object classes may include, for example, a person class, a car class, a building class, a basketball class, or any other object class. In a particular example, the object detection output 106 for video frame 102 may include data defining a bounding box 110 around a person depicted in video frame 102 and numerical data indicating a high probability that the portion of the video frame inside the bounding box depicts a person.

To generate the object detection outputs, the system 100 sequentially processes each of the video frames using an object detection neural network 112. For each video frame, the object detection neural network 112 is configured to process the video frame in accordance with current values of object detection neural network parameters to generate a respective object detection output for the video frame. The object detection neural network 112 includes a convolutional neural network layer 114 which immediately precedes a recurrent neural network layer 116 in an ordering of the layers of the object detection neural network 112. Generally, the object detection neural network 112 may include one or more layers preceding the convolutional neural network layer 114, and one or more layers following the recurrent neural network layer 116. The overall architecture of the object detection neural network 112 may be derived from region-based two-stage object detection neural networks or single shot detector (SSD) object detection neural networks.

To process a current video frame, the object detection neural network 112 derives a layer input for the convolutional neural network layer 114 from the current video frame. For example, if the convolutional neural network layer 114 is a first layer in the object detection neural network 112, then the layer input for the convolutional neural network layer may be the current video frame itself. As another example, if the convolutional neural network layer 114 is preceded by one or more preceding layers in the object detection neural network 112, then the layer input for the convolutional neural network layer 114 may be a feature map generated by processing the current video frame using the preceding layers.

The convolutional neural network layer 114 is configured to process the layer input in accordance with current values of convolutional neural network layer parameters to generate a spatial feature map 118 (or 120). The spatial feature map 118 may be represented as a multi-dimensional (e.g., three-dimensional (3D)) matrix of feature outputs. The spatial feature map 118 may be a representation of visual features present in the layer input for the convolutional neural network layer 114.

The recurrent neural network layer 116 is configured to receive an input including: (i) the spatial feature map 118 generated by the convolutional neural network layer 114, and (ii) an output of the recurrent neural network layer 116 for a previous video frame. A "previous video frame" refers to a video frame preceding the current video frame in the ordering of the video frames. When the current video frame is the first video frame, default values can be substituted for the output of the recurrent neural network layer 116 for the previous video frame in the input to the recurrent neural network layer 116 for the current video frame. The recurrent neural network layer 116 is configured to process the recurrent neural network layer input in accordance with current values of recurrent neural network layer parameters to generate a recurrent neural network layer output.

In some implementations, the recurrent neural network layer output is a spatio-temporal feature map 122 (or 124). The spatio-temporal feature map 122 may be represented as a multi-dimensional matrix of feature outputs. The object detection neural network 112 may generate the object detection output for the current video frame by processing the spatio-temporal feature map 122 using one or more layers following the recurrent neural network layer 116 in the object detection neural network 112. In some other implementations, the recurrent neural network layer output is the object detection output for the current video frame (e.g., if the recurrent neural network layer 116 is a final neural network layer in the object detection neural network 112). As described earlier, the object detection output for the current video frame includes data identifying respective positions and labels of one or more objects depicted in the current video frame.

The recurrent neural network layer 116 enables the object detection neural network 112 to propagate frame-level information across time and thereby exploit various temporal cues to obtain more accurate and stable object detection outputs. Since videos exhibit temporal continuity, objects in adjacent video frames will remain in similar positions and detections may not vary substantially. Therefore, detection information from earlier video frames can be used to refine the object detection output generated by the object detection neural network 112 for the current video frame. For example, the recurrent neural network layer 116 can condition the spatio-temporal feature map 122 generated for the current video frame on the spatio-temporal feature map generated for the previous video frame. Therefore, the recurrent neural network layer 116 allows the object detection neural network 112 to exploit continuity at the feature level to generate more informative spatio-temporal feature maps.

In some cases, the object detection neural network 112 interleaves multiple convolutional neural network layers and recurrent neural network layers. For example, in some cases the object detection neural network 112 architecture can be generally described by the following consecutive layer sequence: first convolutional neural network layer, first recurrent neural network layer, second convolutional neural network layer, second recurrent neural network layer, and output layer. In this example, the output layer may be configured to process the spatio-temporal feature map generated by the second recurrent neural network layer to generate the object detection output.

Generally, the recurrent neural network layer 116 may be implemented in any appropriate recurrent neural network layer configuration, for example, as a long short-term memory (LSTM) layer or an LSTM layer with "peephole" connections. However, some conventional recurrent neural network layer configurations have substantial computational resource requirements (e.g., requirements of memory, computing power, or both). These computational resource requirements can limit the deployment of conventional recurrent neural network layers to resource-constrained environments (e.g., mobile devices) or in applications which require real-time processing speeds. To reduce the computational resource requirements of the recurrent neural network layer 116 while incurring little (if any) reduction in accuracy, the recurrent neural network layer 116 can be implemented as an efficient "bottleneck" recurrent neural network layer.

When the recurrent neural network layer 116 is implemented as a bottleneck recurrent neural network layer, the input to the recurrent neural network layer (as described earlier) is initially processed by one or more convolutional neural network layers, referred to in this specification as a bottleneck gate. The bottleneck gate is configured to generate a lower-dimensionality representation of the input to the recurrent neural network layer 116, referred to in this specification as a bottleneck representation. The bottleneck representation may have a lower dimensionality than the input to the bottleneck recurrent neural network layer 116 due to having fewer channels, a lower resolution, or both. The recurrent neural network layer 116 uses the bottleneck representation generated by the bottleneck gate to update an internal state of the recurrent neural network layer, and subsequently uses the updated internal state to generate the output of the recurrent neural network layer 116.

By incorporating a dimensionality-reducing bottleneck gate, the recurrent neural network layer 116 can reduce computational resource consumption (e.g., measured in terms of arithmetic operations performed) to generate the recurrent neural network layer output. Moreover, the bottleneck gate can increase the depth of the recurrent neural network layer 116 which can enable the recurrent neural network layer 116 to generate more informative outputs (e.g., spatio-temporal feature maps).

Generally, recurrent neural network layers can be implemented as bottleneck recurrent neural network layers in any video processing neural network. That is, the use of bottleneck recurrent neural network layers is not limited to object detection neural networks. For example, bottleneck recurrent neural network layers can be included in video segmentation neural networks, video captioning neural networks, or in any other video processing neural network. An example of a bottleneck recurrent neural network layer architecture is described below with reference to FIG. 2.

The object detection neural network 112 can be trained using machine learning training techniques (e.g., backpropagation-through-time) over multiple training iterations based on a set of training videos. Each video frame of each training video may be annotated by data indicating the positions and labels of the objects depicted in the video frame. In some cases, the convolutional neural network layers of the object detection neural network 112 may be trained for a number of initial training iterations without the recurrent neural network layers. That is, for a number of initial training iterations, the recurrent neural network layers may be removed from the object detection neural network 112. After the initial training iterations, the recurrent neural network layers may be inserted into the object detection neural network 112 and jointly trained with the convolutional neural network layers. In some cases, the convolutional neural network layers and the recurrent neural network layers can be jointly pre-trained.

Figure 2:
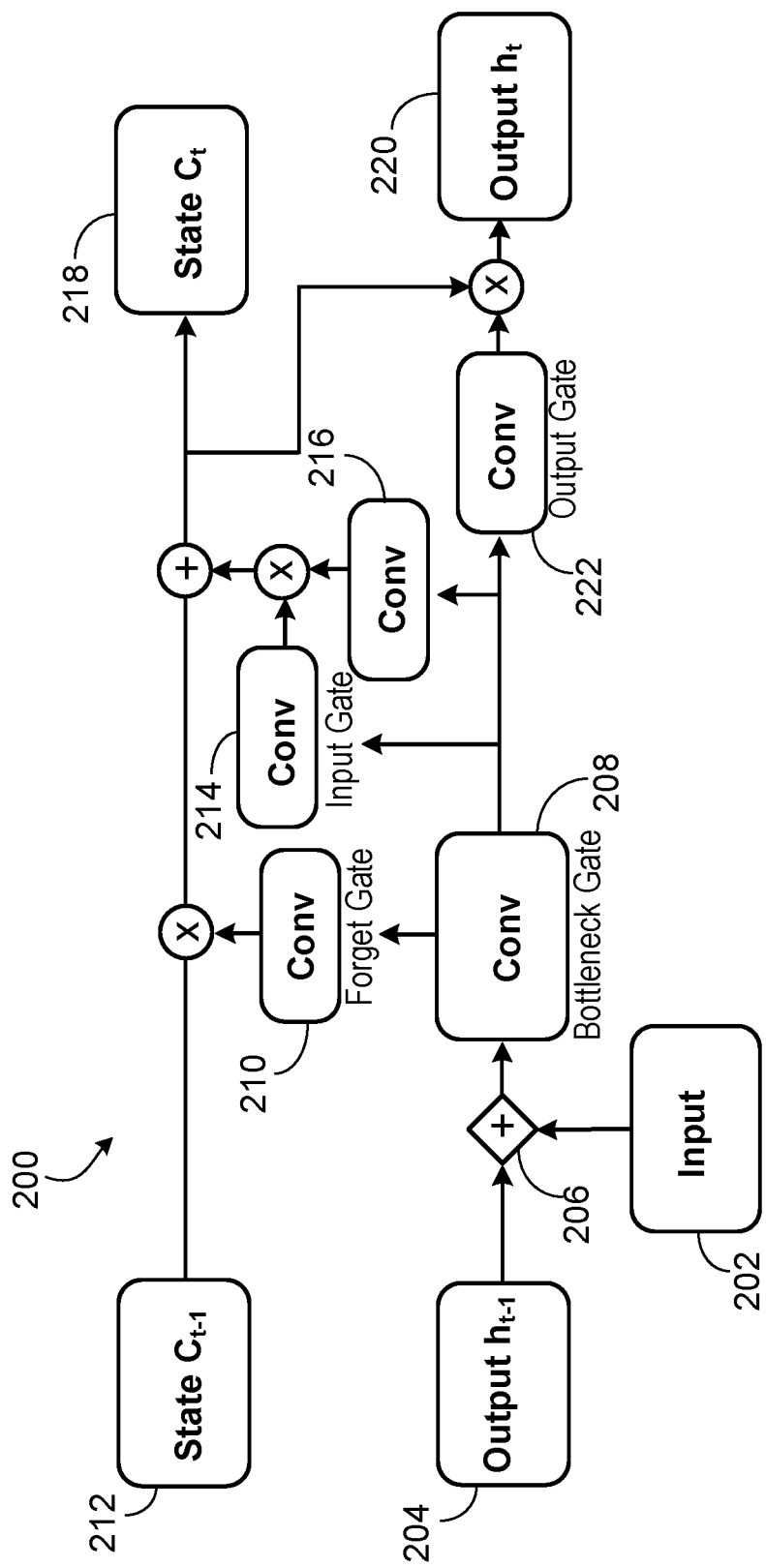
FIG. 2 is a block diagram of an example bottleneck long short-term memory (LSTM) layer.

FIG. 2 shows an example bottleneck LSTM layer 200. The bottleneck LSTM layer 200 is configured to receive the input 202 (e.g., a spatial feature map 118) and the output $h_{t-1}$ 204 of the bottleneck LSTM layer 200 for a previous video frame (e.g., a spatio-temporal feature map 122). The bottleneck LSTM layer 200 concatenates (e.g., as depicted in 206) the output $h_{t-1}$ 204 and the input 202 (e.g., by channel-wise concatenation) and processes the concatenated output $h_{t-1}$ 204 and input 202 by the bottleneck gate 208. As described earlier, the bottleneck gate 208 generates a bottleneck representation having a lower dimensionality than the concatenation of the output $h_{t-1}$ 204 and the input 202. For example, if input 202 has dimensionality H×W×M and the output $h_{t-1}$ 204 has dimensionality H×W×N, then the concatenation of the input 202 and the output $h_{t-1}$ 204 may have dimensionality H×W×(M+N), while the bottleneck representation may have reduced dimensionality H×W×N.

The bottleneck LSTM layer 200 processes the bottleneck representation by a forget gate 210 (which may include one or more convolutional neural network layers) and adjusts the internal (cell) state $C_{t-1}$ 212 by element-wise multiplying the internal state $C_{t-1}$ 212 by the output of the forget gate 210. The bottleneck LSTM layer 200 processes the bottleneck representation using an input gate 214 (which may include one or more convolutional neural network layers) and one or more convolutional layers 216 and adds the element-wise product of their respective outputs to the internal state $C_{t-1}$ 212. In this manner, the bottleneck LSTM layer 200 generates the updated internal state $C_t$ 218 using the outputs of the forget gate 210 and the input gate 214. The bottleneck LSTM layer 200 generates the output $h_t$ 220 by processing the bottleneck representation by an output gate 222 (which may include one or more convolutional neural network layers) and determining the element-wise product between the output of the output gate 222 and the updated internal state $C_t$ 218.

The computational resource consumption of the bottleneck LSTM layer 200 is reduced by the forget gate 210, input gate 214, and output gate 222 processing the reduced-dimensionality bottleneck representation rather than the concatenation of the output $h_{t-1}$ 204 and the input 202. To further reduce computational resource consumption, the convolutional layers included in the bottleneck LSTM layer 200 can be implemented as depth-wise separable convolutional layers. In a depth-wise separable convolutional layer, the convolutional operations are factorized into cross-channel (i.e., 1×1) convolutions followed by spatial convolutions in order to reduce computational resource consumption.

Figure 3:
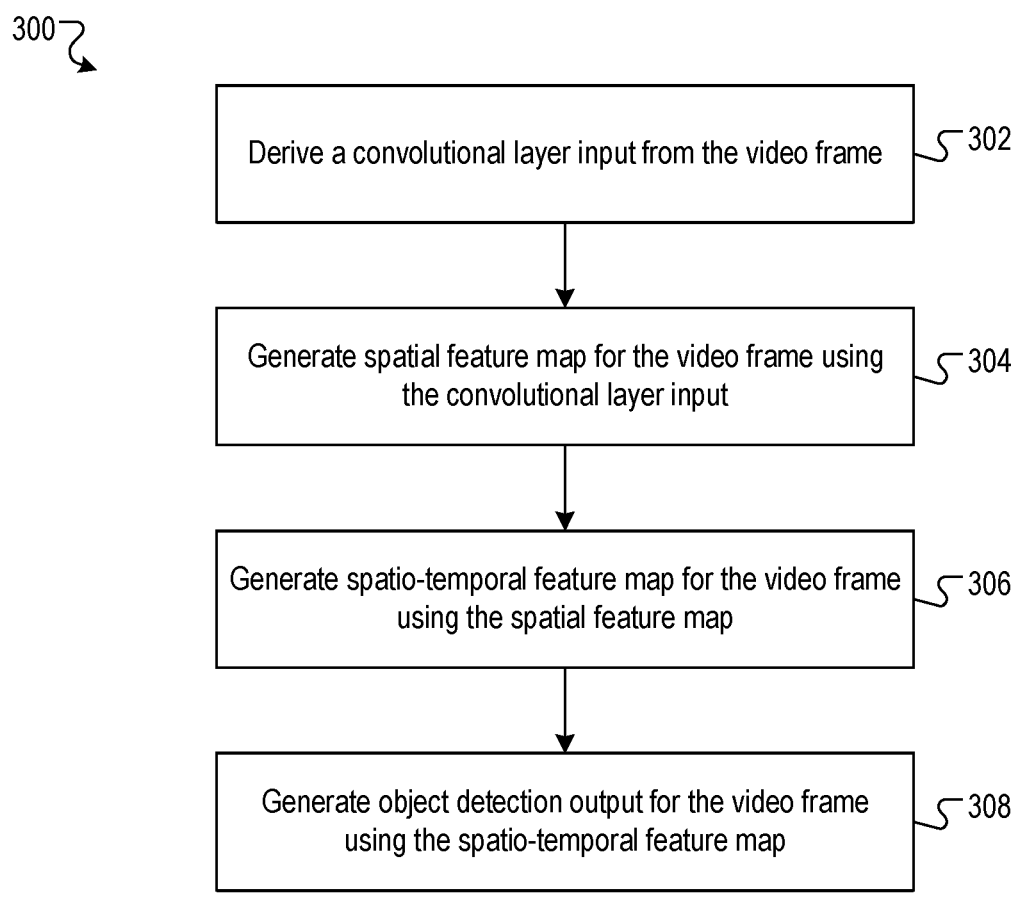
FIG. 3 is a flow diagram of an example process for generating an object detection output for a current video frame.

FIG. 3 is a flow diagram of an example process 300 for generating an object detection output for a current video frame. Generally, to generate object detection outputs for each video frame in a sequence of video frames, the process 300 is sequentially repeated for each video frame in the sequence. For convenience, the process 300 will be described as being performed by a system of one or more computers located in one or more locations. For example, an object detection system, e.g., the object detection system 100 of FIG. 1, appropriately programmed in accordance with this specification, can perform the process 300.

The system derives a convolutional layer input from the video frame (302). For example, if the convolutional neural network layer is a first layer in the object detection neural network, then the convolutional layer input may be the current video frame itself. As another example, if the convolutional neural network layer is preceded by one or more preceding layers in the object detection neural network, then the convolutional layer input may be a feature map generated by processing the current video frame using the preceding layers.

The system generates a spatial feature map by processing the convolutional layer input using the convolutional neural network layer in accordance with current values of convolutional neural network layer parameters (304). The spatial feature map may be represented as a multi-dimensional matrix of feature outputs. The spatial feature map may be a representation of visual features present in the convolutional layer input.

The system generates a spatio-temporal feature map by processing a recurrent neural network layer input in accordance with current values of recurrent neural network layer parameters (306). The recurrent neural network layer is configured process an input including: (i) the spatial feature map generated by the convolutional neural network layer (e.g., as described in 304), and (ii) a spatio-temporal feature map generated by the recurrent neural network layer for a previous video frame. When the current video frame is the first video frame, the system can substitute default values for the output of the recurrent neural network layer for the previous video frame in the input to the recurrent neural network layer for the current video frame. The spatio-temporal feature map may be represented as a multi-dimensional matrix of feature outputs. The recurrent neural network layer can be implemented as a bottleneck recurrent neural network layer, as described with reference to FIG. 4.

The system generates an object detection output for the current video frame (308). The system may generate the object detection output for the current video frame by processing the spatio-temporal feature map generated by the recurrent neural network layer (as described in 306) using one or more layers following the recurrent neural network layer in the object detection neural network. The object detection output for the current video frame includes data identifying respective positions and labels of one or more objects depicted in the current video frame.

Figure 4:
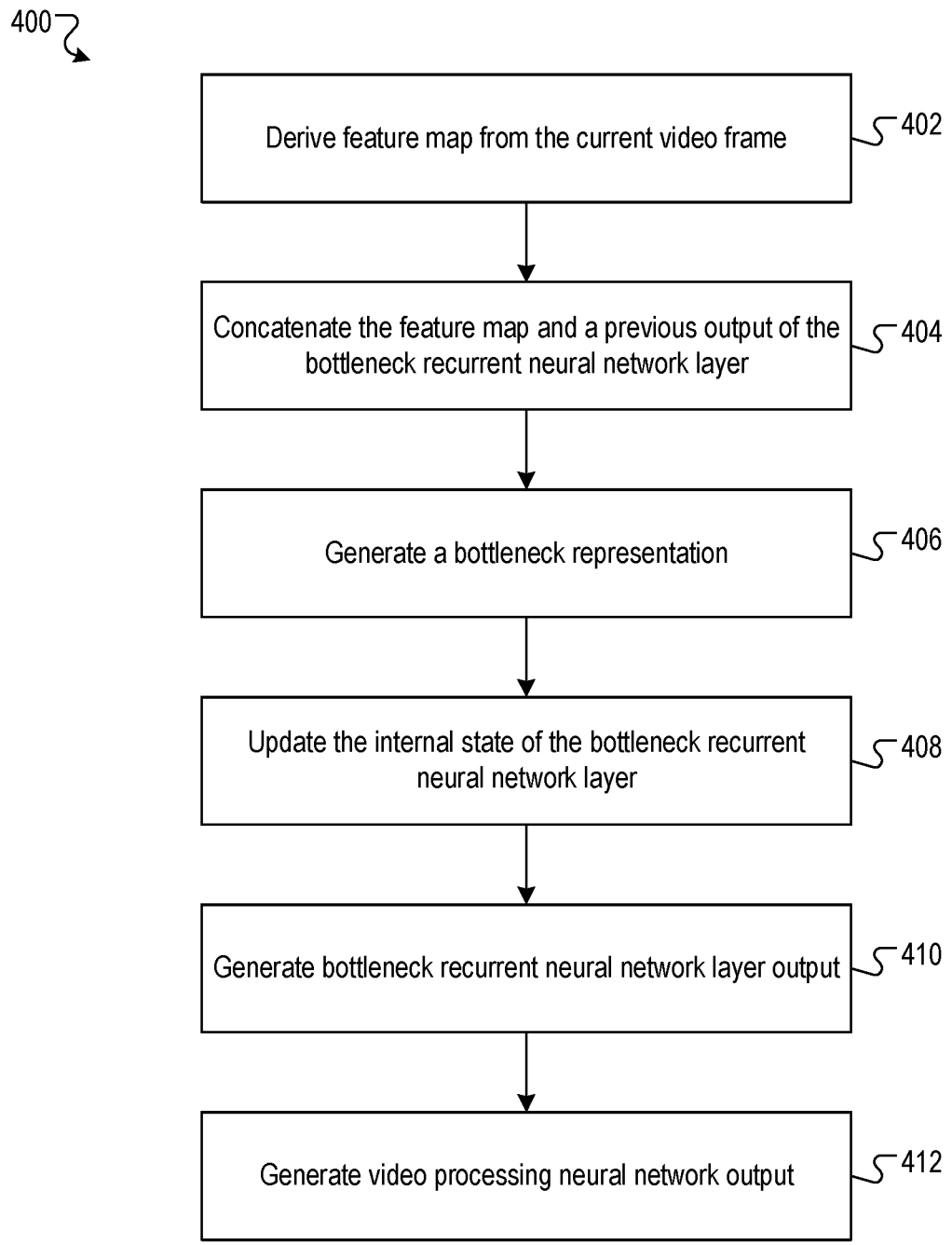
FIG. 4 is a flow diagram of an example process for processing a current video frame using a video processing neural network that includes a bottleneck recurrent neural network layer.

FIG. 4 is a flow diagram of an example process 400 for processing a current video frame using a video processing neural network that includes a bottleneck recurrent neural network layer. The video processing neural network is configured to sequentially process a sequence of video frames to generate a respective video processing neural network output for each video frame in the sequence of video frames.

The video processing neural network derives a feature map from the current video frame (402). For example, the video processing neural network may derive a feature map from the current video frame by processing the current video frame using one or more neural network layers (e.g., convolutional layers, fully-connected layers, or recurrent layers). In this example, the feature map may be represented as a multi-dimensional matrix of feature outputs. As another example, if the bottleneck recurrent neural network layer is the first layer in the video processing neural network, then the video processing neural network may determine the feature map to be the current video frame itself.

The video processing neural network provides the feature map to the bottleneck recurrent neural network layer, and the bottleneck recurrent neural network layer concatenates the feature map and an output generated by the bottleneck recurrent neural network layer for a previous video frame (404). For example, the bottleneck recurrent neural network layer may channel-wise concatenate the feature map derived from the current video frame and the output generated by the bottleneck recurrent neural network layer for a previous video frame. In this example, if the feature map has dimensionality H×W×M and the previous output of the bottleneck recurrent neural network layer has dimensionality H×W×N, then their concatenation may have dimensionality H×W×(M+N).

The bottleneck recurrent neural network layer processes the concatenation of the feature map and the previous output of the bottleneck recurrent neural network layer using a bottleneck gate to generate a bottleneck representation (406). The bottleneck gate includes one or more neural network layers (e.g., convolutional neural network layers). For example, the bottleneck recurrent neural network layer may generate the bottleneck representation $b_t$ as:

$$b_t = \phi(W_b * [x_t, h_{t-1}])  \quad (x)$$

where $\phi(\cdot)$ is an activation function (e.g., a rectified linear unit (ReLU)), $W_b*X$ represents depth-wise separable convolution with weights $W_b$, and $[x_t, h_{t-1}]$ represents the concatenation of the feature map $x_t$ and the previous output $h_{t-1}$ of the bottleneck recurrent neural network layer. Generally, the bottleneck representation has a lower dimensionality than the concatenation of the feature map and the previous output of the bottleneck recurrent neural network layer (e.g., due to having fewer channels, a lower resolution, or both).

The bottleneck recurrent neural network layer updates the internal state of the bottleneck recurrent neural network layer using the bottleneck representation (408). For example, the bottleneck recurrent neural network layer may update an internal cell state $c_{t-1}$ in accordance with the following equations:

$$f_t = \phi(W_f * b_t)  \quad (x)$$

$$i_t = \phi(W_i * b_t)  \quad (x)$$

$$c_t = f_t \odot c_{t-1} + i_t \odot \phi(W_c * b_t)  \quad (x)$$

where $\phi(\cdot)$ is an activation function (e.g., a rectified linear unit (ReLU)), $f_t$ is the output of the forget gate, $W_f$ are the weights of the forget gate (e.g., convolutional filter weights), where $i_t$ is the output of the input gate, $W_i$ are the weights of the input gate (e.g., convolutional filter weights), $c_t$ is the updated internal state, $\odot$ represents element-wise multiplication, $b_t$ is the bottleneck representation, and $W*X$ represents depth-wise separable convolution with weights $W$.

The bottleneck recurrent neural network layer generates an output for the current video frame using the updated internal state of the bottleneck recurrent neural network layer (410). For example, the bottleneck recurrent neural network layer may generate an output $h_t$ in accordance with the equations:

$$o_t = \phi(W_o * b_t)  \quad (x)$$

$$h_t = o_t \odot \phi(c_t)  \quad (x)$$

where $\phi(\cdot)$ is an activation function (e.g., a rectified linear unit (ReLU)), $o_t$ is the output of the output gate, $W_o$ are the weights of the output gate (e.g., convolutional filter weights), $c_t$ is the updated internal state, $\odot$ represents element-wise multiplication, $b_t$ is the bottleneck representation, and $W*X$ represents depth-wise separable convolution with weights $W$.

The video processing neural network processes the output of the bottleneck recurrent neural network layer to generate a video processing network output characterizing the current video frame (412). For example, the video processing network output may include data defining the positions and labels of objects depicted in the current video frame, a segmentation of the current video frame, or a caption representing the contents of the current video frame.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by a data processing apparatus, the method comprising:
   receiving a plurality of video frames;
   sequentially processing the video frames using an object detection neural network to generate an object detection output for each video frame, wherein the object detection output for each video frame defines a predicted position and a predicted label of an object depicted in the video frame;
   wherein the object detection neural network includes a convolutional neural network layer and a recurrent neural network layer; and
   wherein for each video frame after an initial video frame in the plurality of video frames, processing the video frame using the object detection neural network comprises:
      deriving a convolutional layer input from the video frame;
      generating a spatial feature map for the video frame, comprising processing the convolutional layer input using the convolutional layer;
      generating a spatio-temporal feature map for the video frame, comprising processing (i) the spatial feature map for the video frame, and (ii) a spatio-temporal feature map generated by the recurrent neural network layer for a previous video frame, using the recurrent neural network layer; and
      generating the output defining the predicted position and the predicted label of the object depicted in the video frame using the spatio-temporal feature map.

2. The method of claim 1, wherein the recurrent neural network layer is a long short-term memory layer.

3. The method of claim 1, wherein using the recurrent neural network layer to process a recurrent layer input comprising: (i) the spatial feature map for the video frame, and (ii) a spatio-temporal feature map generated by the recurrent neural network layer for a previous video frame, comprises:
   processing the recurrent layer input using a bottleneck gate comprising one or more convolutional neural network layers to generate a bottleneck representation, wherein the bottleneck representation has a lower dimensionality than the recurrent layer input;
   updating an internal state of the recurrent neural network layer using the bottleneck representation; and
   generating the spatio-temporal feature map for the video frame using the updated internal state of the recurrent neural network layer.

4. The method of claim 1, wherein the output defining the predicted position and the predicted label of the object depicted in the video frame comprises:
   data defining a bounding box in the video frame; and
   for each of a plurality of object classes, a respective probability that the portion of the video frame inside the bounding box depicts an object of the object class.

5. The method of claim 1, wherein the object detection neural network includes a plurality of convolutional neural network layers and recurrent neural network layers.

6. The method of claim 1, wherein the object detection neural network is trained over a plurality of training iterations, comprising:
   a plurality of first training iterations, wherein the recurrent neural network layers are removed from the object detection neural network; and
   a plurality of second training iterations, wherein the recurrent neural network layers are inserted into the object detection neural network.

7. The method of claim 1, wherein deriving a convolutional layer input from the video frame comprises processing the video frame using a plurality of convolutional layers, a plurality of recurrent neural network layers, or both.

8. A system comprising:
   a memory storing instructions that are executable; and
   one or more computers to execute the instructions to perform operations comprising:
   receiving a plurality of video frames;
   sequentially processing the video frames using an object detection neural network to generate an object detection output for each video frame, wherein the object detection output for each video frame defines a predicted position and a predicted label of an object depicted in the video frame;
   wherein the object detection neural network includes a convolutional neural network layer and a recurrent neural network layer; and wherein for each video frame after an initial video frame in the plurality of video frames, processing the video frame using the object detection neural network comprises:
  deriving a convolutional layer input from the video frame;
  generating a spatial feature map for the video frame, comprising processing the convolutional layer input using the convolutional layer;
  generating a spatio-temporal feature map for the video frame, comprising processing (i) the spatial feature map for the video frame, and (ii) a spatio-temporal feature map generated by the recurrent neural network layer for a previous video frame, using the recurrent neural network layer; and
  generating the output defining the predicted position and the predicted label of the object depicted in the video frame using the spatio-temporal feature map.

9. The system of claim 8, wherein the recurrent neural network layer is a long short-term memory layer.

10. The system of claim 8, wherein using the recurrent neural network layer to process a recurrent layer input comprising: (i) the spatial feature map for the video frame, and (ii) a spatio-temporal feature map generated by the recurrent neural network layer for a previous video frame, comprises:
  processing the recurrent layer input using a bottleneck gate comprising one or more convolutional neural network layers to generate a bottleneck representation, wherein the bottleneck representation has a lower dimensionality than the recurrent layer input;
  updating an internal state of the recurrent neural network layer using the bottleneck representation; and
  generating the spatio-temporal feature map for the video frame using the updated internal state of the recurrent neural network layer.

11. The system of claim 8, wherein the output defining the predicted position and the predicted label of the object depicted in the video frame comprises:
  data defining a bounding box in the video frame; and
  for each of a plurality of object classes, a respective probability that the portion of the video frame inside the bounding box depicts an object of the object class.

12. One or more non-transitory computer storage media storing instructions that when executed by one or more computers cause the one or more computers to perform operations comprising:
  receiving a plurality of video frames;
  sequentially processing the video frames using an object detection neural network to generate an object detection output for each video frame, wherein the object detection output for each video frame defines a predicted position and a predicted label of an object depicted in the video frame;
  wherein the object detection neural network includes a convolutional neural network layer and a recurrent neural network layer; and
  wherein for each video frame after an initial video frame in the plurality of video frames, processing the video frame using the object detection neural network comprises:
    deriving a convolutional layer input from the video frame;
    generating a spatial feature map for the video frame, comprising processing the convolutional layer input using the convolutional layer;
    generating a spatio-temporal feature map for the video frame, comprising processing (i) the spatial feature map for the video frame, and (ii) a spatio-temporal feature map generated by the recurrent neural network layer for a previous video frame, using the recurrent neural network layer; and
    generating the output defining the predicted position and the predicted label of the object depicted in the video frame using the spatio-temporal feature map.

13. The non-transitory computer storage media of claim 12, wherein the recurrent neural network layer is a long short-term memory layer.

14. The non-transitory computer storage media of claim 12, wherein using the recurrent neural network layer to process a recurrent layer input comprising: (i) the spatial feature map for the video frame, and (ii) a spatio-temporal feature map generated by the recurrent neural network layer for a previous video frame, comprises:
  processing the recurrent layer input using a bottleneck gate comprising one or more convolutional neural network layers to generate a bottleneck representation, wherein the bottleneck representation has a lower dimensionality than the recurrent layer input;
  updating an internal state of the recurrent neural network layer using the bottleneck representation; and
  generating the spatio-temporal feature map for the video frame using the updated internal state of the recurrent neural network layer.

* * * * *